United States Patent [19]

Chen

[11] Patent Number: 5,741,169
[45] Date of Patent: Apr. 21, 1998

[54] DEVICE CAPABLE OF CLIMBING ON TOP OF AN OBSTRUCTION

[76] Inventor: Hwa-Lo Chen, 5F, No. 56, Chin-Chiang St., Chung-Cheng Dist., Taipei City, Taiwan

[21] Appl. No.: 812,996

[22] Filed: Mar. 4, 1997

[51] Int. Cl.⁶ .......................... A63H 17/40; A63H 29/00; A61G 5/02
[52] U.S. Cl. ...................... 446/441; 446/457; 280/5.3
[58] Field of Search .................................. 446/436, 441, 446/442, 457, 465; 280/5.2, 5.3

[56] References Cited

U.S. PATENT DOCUMENTS

| | | | |
|---|---|---|---|
| 2,108,434 | 2/1938 | Fujii | 446/442 |
| 4,198,049 | 4/1980 | Kurita | 446/442 |
| 4,618,155 | 10/1986 | Jayne | 280/5.28 |
| 4,676,763 | 6/1987 | Saito et al. | 446/441 |
| 5,195,762 | 3/1993 | Pressly | 280/5.28 |
| 5,653,301 | 8/1997 | Andre | 180/8.2 |

FOREIGN PATENT DOCUMENTS

| | | | |
|---|---|---|---|
| 1050583 | 3/1979 | Canada | 280/5.3 |
| 4036890 | 5/1992 | Germany | 280/5.2 |
| 4409807 | 9/1994 | Germany | 280/5.2 |

Primary Examiner—Robert A. Hafer
Assistant Examiner—Laura Fossum
Attorney, Agent, or Firm—Knobbe, Martens, Olson & Bear, LLP

[57] ABSTRACT

A climbing device includes a hollow housing, a rotary drive unit, and a direction changing gear set having a main drive gear coupled to the drive unit, a transmission gear meshing with the main drive gear, first and second direction changing gears, a driven gear driven rotatably by one of the first and second direction changing gears, and a bevel gear mounted coaxially on the driven gear. A rotary wheel set is driven rotatably by the transmission gear to result in movement of the housing on a ground surface. A shift unit is disposed in the housing and has the first and second direction changing gears mounted rotatably thereon. The shift unit extends through an aperture formed in a front wall of the housing and is retractable into the housing, upon bumping into an obstruction, to move the first and second direction changing gears from a first operating state, where the first direction changing gear meshes with the main drive gear and drives rotatably the driven gear, to a second operating state, where the second direction changing gear meshes with the transmission gear and drives rotatably the driven gear. A climbing unit includes a rack which extends through aligned openings in top and bottom walls of the housing and which meshes with the bevel gear.

6 Claims, 7 Drawing Sheets

DEVICE CAPABLE OF CLIMBING ON TOP OF AN OBSTRUCTION

BACKGROUND OF THE INVENTION

1. Field of the Invention

The invention relates to a climbing device, more particularly to a device which is capable of climbing on top of an obstruction, such as a step of a stairway.

2. Description of the Related Art

Motor powered toy cars are known in the art. However, such conventional toy cars are not capable of further forward movement upon bumping into an obstruction.

SUMMARY OF THE INVENTION

Therefore, the object of the present invention is to provide a device which is capable of climbing on top of an obstruction, such as a step of a stairway.

Accordingly, the device of this invention is capable of climbing on top of an obstruction, and comprises:

a hollow housing having top and bottom walls with front and rear portions, aligned rack openings formed respectively at the rear portions of the top and bottom walls, and a front wall interconnecting the front portions of the top and bottom walls and formed with an aperture;

a rotary drive unit mounted inside the housing and provided with a rotary output shaft;

a direction changing gear set disposed inside the housing and including a main drive gear coupled to the output shaft, a transmission gear meshing with the main drive gear, first and second direction changing gears disposed above the main drive gear, a driven gear driven rotatably by one of the first and second direction changing gears, and a bevel gear mounted coaxially on the driven gear;

a rotary wheel set including front and rear drive gears mounted rotatably in the housing and front and rear wheel units coupled respectively and coaxially on the front and rear drive gears for rotation therewith, the front and rear wheel units being capable of supporting the housing on a ground surface, the rear drive gear being driven rotatably by the transmission gear to drive rotatably the front and rear wheel units and move the housing on the ground surface;

a shift unit disposed in the housing and extending out of the aperture in the front wall of the housing, the shift unit having the first and second direction changing gears mounted rotatably thereon and being retractable into the housing upon bumping into the obstruction to move the first and second direction changing gears from a first operating state, where the first direction changing gear meshes with the main drive gear and drives rotatably the driven gear, to a second operating state, where the second direction changing gear meshes with the transmission gear and drives rotatably the driven gear; and a climbing unit including a rack which extends through the aligned openings in the top and bottom walls of the housing and which meshes with the bevel gear, the rack being movable upward relative to the housing when the first and second direction changing gears are in the first operating state and being movable downward relative to the housing when the first and second direction changing gears are in the second operating state.

In the disclosed embodiment, the shift unit includes a push arm which extends out of the aperture in the front wall of the housing, a horizontal support rod which is disposed in the housing and which is movable horizontally therein, the support rod having a front end portion adjacent to the push arm and a rear end portion with the first and second direction changing gears mounted rotatably thereon, and a spring interconnecting the housing and the support rod to pull the support rod toward the push arm. The push arm is retractable into the housing against biasing action of the spring upon bumping into the obstruction to move the first and second direction changing gears from the first operating state to the second operating state.

BRIEF DESCRIPTION OF THE DRAWINGS

Other features and advantages of the present invention will become more apparent in the following detailed description of the preferred embodiment, with reference to the accompanying drawings, of which.

DETAILED DESCRIPTION OF THE PREFERRED EMBODIMENT

Figure 1:
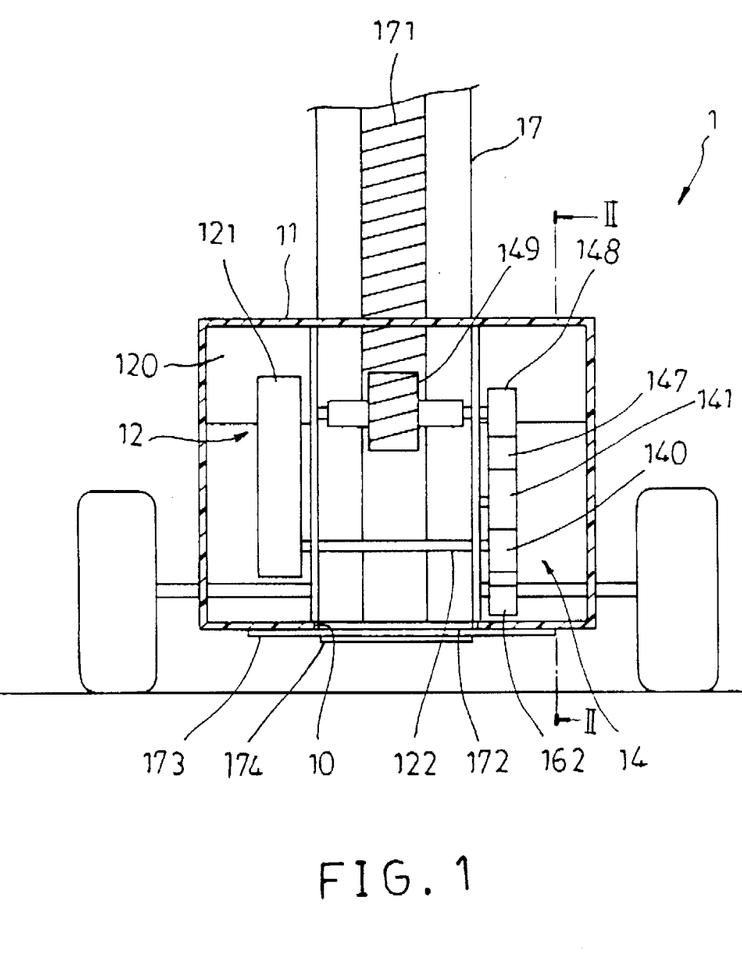
FIG. 1 is a sectional view of the preferred embodiment of a climbing device according to the present invention.
Figure 2:
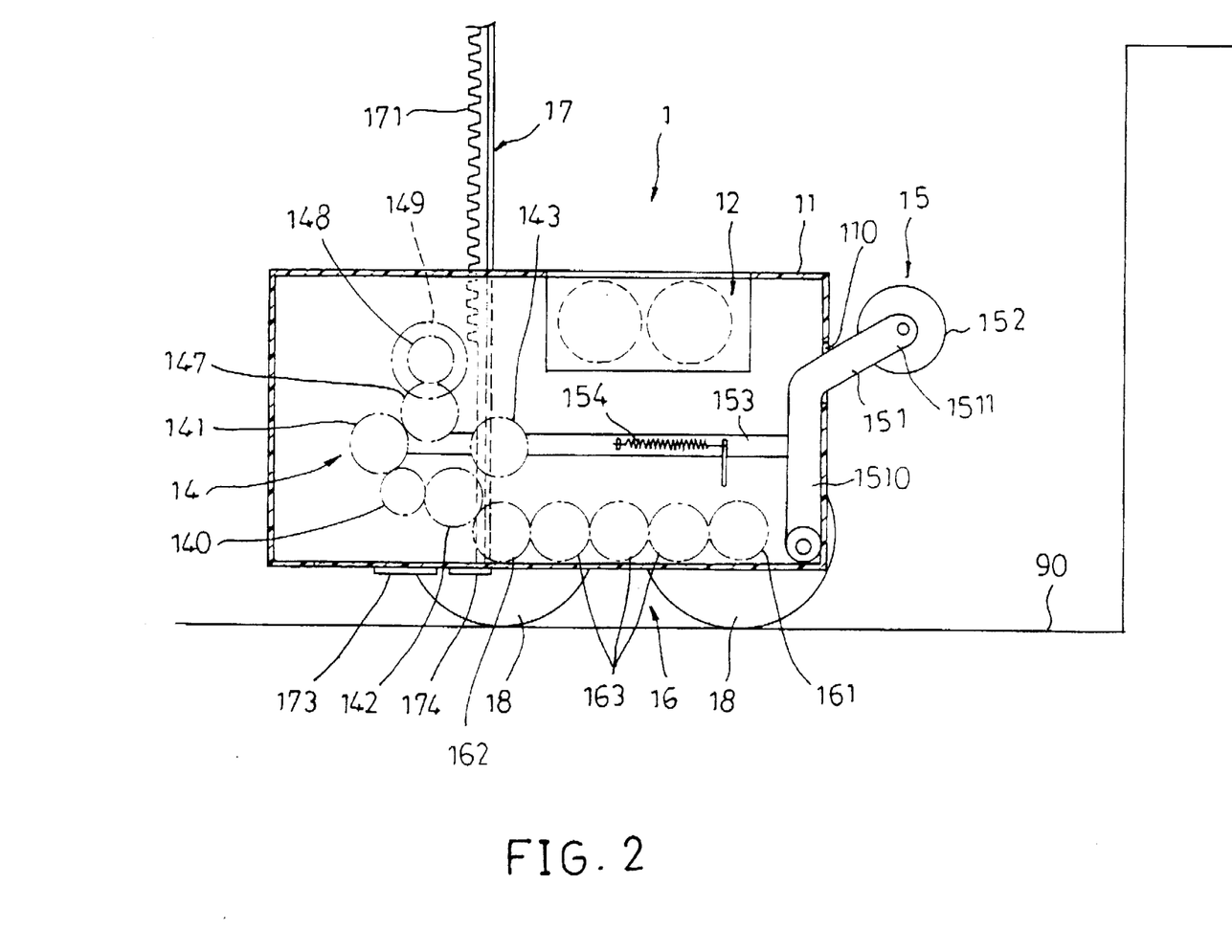
FIG. 2 is another sectional view of the preferred embodiment, taken along line II—II in FIG. 1.

Referring to FIGS. 1 and 2, the preferred embodiment of a climbing device 1 according to the present invention is shown to comprise a hollow housing 11, a rotary drive unit 12 mounted inside the housing 11, a shift unit 15 disposed in the housing 11, a direction changing gear set 14 disposed inside the housing 11 and driven rotatably by the drive unit 12, a rotary wheel set 16 driven rotatably by the direction changing gear set 14, and a climbing unit 17 driven operably by the direction changing gear set 14.

The housing 11 has top and bottom walls with front and rear portions, aligned rack openings 10 formed respectively at the rear portions of the top and bottom walls, and a front wall interconnecting the front portions of the top and bottom walls and formed with an aperture 110. The rotary drive unit 12 includes a driver 120, such as a motor, and a speed-reducing mechanism 121 driven by the driver 120. The shift unit 15 includes a push arm 151 having an upright arm portion 1510 and an inclined arm portion 1511. The upright arm portion 1510 is disposed in the housing 11 and has a top end and a bottom end mounted pivotally on the bottom wall of the housing 11. The inclined arm portion 1511 extends from the top end of the upright arm portion 1510 and out of the aperture 110 formed in the front wall of the housing 11. A contact roller 152 is mounted rotatably on a distal end of the inclined arm portion 1511. The shift unit 15 further includes a horizontal support rod 153 disposed in the housing 11 and movable horizontally in the latter. The support rod 153 has a front end portion which is adjacent to the upright arm portion 1510 of the push arm 151. A spring 154, such as a tension spring, has a first end connected to the housing 11 and a second end connected to the support rod 153. The spring 154 pulls the support rod 153 toward the push arm 151.

The direction changing gear set 14 includes a main drive gear 140 coupled to a rotary output shaft 122 of the speed-reducing mechanism 121, a transmission gear 142 meshing with the main drive gear 140, and first and second direction changing gears 141, 143 mounted rotatably on a rear end portion of the support rod 153 and disposed above the main drive gear 140, whereby horizontal movement of the support rod 153 in the housing 11 can cause engagement between the main drive gear 140 and a selected one of the direction changing gears 141, 143. The direction changing gear set 14 further includes an idle gear 147 mounted rotatably in the housing 11 between the direction changing gears 141, 143, a driven gear 148 meshing with the idle gear 147, and a bevel gear 149 mounted coaxially on the driven gear 148.

The rotary wheel set 16 includes front and rear drive gears 161, 162 mounted rotatably in the housing 11. Front and rear wheel units 18 are coupled respectively and coaxially on the front and rear drive gears 161, 162 for rotation therewith. The front and rear wheel units 18 are capable of supporting the housing 11 on a ground surface. A plurality of transmitting gears 163 are disposed between the front and rear drive gears 161, 162 and couple the front drive gear 161 to the rear drive gear 162 such that the front and rear drive gears 161, 162 rotate in the same direction. In this embodiment, there are three transmitting gears 163. The rear drive gear 162 is driven rotatably by the transmission gear 142 of the direction changing gear set 14.

The climbing unit 17 includes a rack 171 which extends through the aligned rack openings 10 in the top and bottom walls of the housing 11. The rack 171 meshes with the bevel gear 149 of the direction changing gear set 14 and further has a bottom end which is provided with a transversely extending base plate 172. The base plate 172 has a bottom side provided with a guard projection 173 to limit upward movement of the rack 171 relative to the housing 11, and an anti-slip piece 174.

Referring again to FIGS. 2, when the drive unit 12 is activated, the output shaft 122 of the speed-reducing mechanism 121 drives the main drive gear 140 to rotate in a clockwise direction. The main drive gear 140 drives rotatably the first direction changing gear 141 to rotate in turn the idle gear 147. Rotation of the idle gear 147 at this stage results in corresponding rotation of the driven gear 148 and the bevel gear 149 in a counterclockwise direction, thereby resulting in upward movement of the rack 171 relative to the housing 11. It is noted that the rack 171 has a smooth lower portion. As such, when the rack 171 has moved to an upper limit, the bevel gear 149 disengages the rack 171 to stop further upward driven movement of the latter. The guard projection 173 on the bottom side of the base plate 172 at the bottom end of the rack 171 abuts against the bottom wall of the housing 11 at this time. Simultaneous with the driving of the climbing unit 17 by the main drive gear 140, the transmission gear 142 drives rotatably the rear drive gear 162 in the clockwise direction. Rotation of the rear drive gear 162 is then transmitted to the front drive gear 161 via the transmitting gears 163. As such, clockwise rotation of the front and rear drive gears 161, 162 results in corresponding clockwise rotation of the front and rear wheel units 18, thereby permitting the climbing device 1 to move forward on a ground surface 90.

Figure 3:
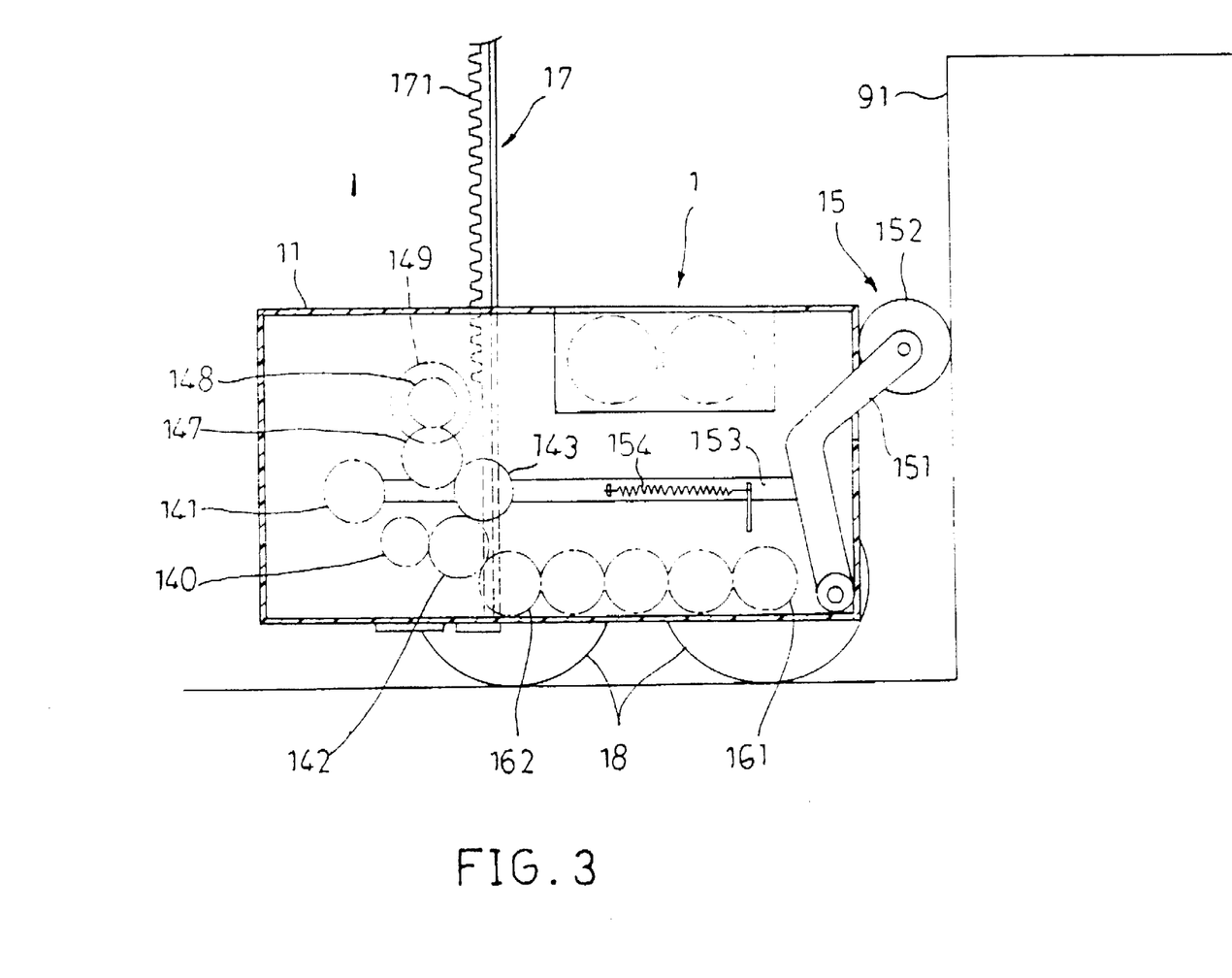
FIG. 3 illustrates the preferred embodiment upon bumping into a step of a stairway.
Figure 4:
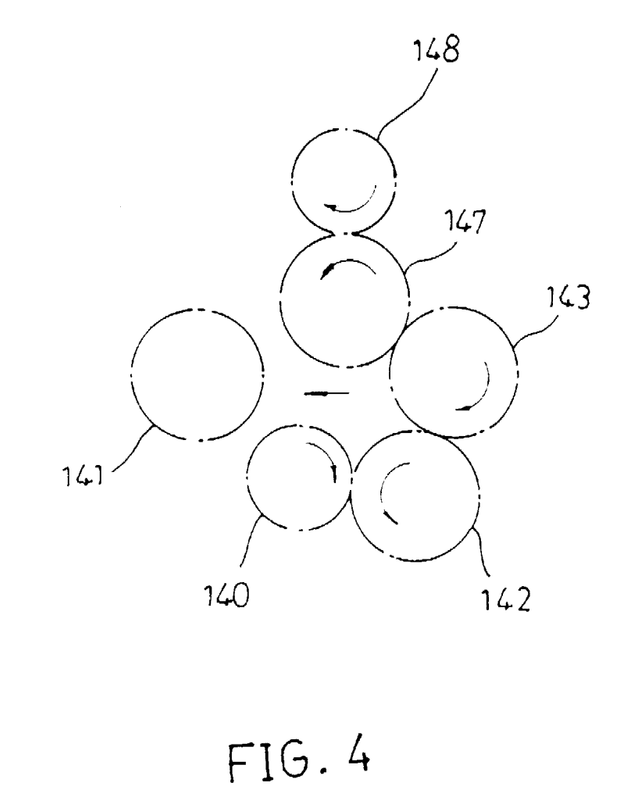
FIG. 4 illustrates a direction changing gear set of the preferred embodiment in a first operating state.

Referring to FIGS. 3 and 4, when the contact roller 152 of the climbing device 1 bumps into a step 91 of a stairway, the push arm 151 is forced to pivot rearwardly, thereby pushing the support rod 153 rearwardly against the action of the spring 154 to disengage the first direction changing gear 141 from the main drive gear 140 and the idle gear 147, and to engage the second direction changing gear 143 with the idle gear 147 and the transmission gear 142. As shown in FIG. 4, the transmission gear 142 drives rotatably the second direction changing gear 143 in the clockwise direction, thereby resulting in counterclockwise rotation of the idle gear 147 and in clockwise rotation of the driven gear 148 and the bevel gear 149. At this time, due to the weight of the rack 171, the bevel gear 149 again engages the rack 171 and causes the latter to move downward relative to the housing 11. Further downward movement of the rack 171 is arrested once the base plate 172 abuts against the ground surface 90. However, due to the continued rotation of the bevel gear 149, the housing 11 now moves upwardly along the rack 171. As the housing 11 moves upward, the transmission gear 142 continues to drive rotatably the front and rear drive gears 161, 162 to result in continued rotation of the front and rear wheel units 18.

Figure 5:
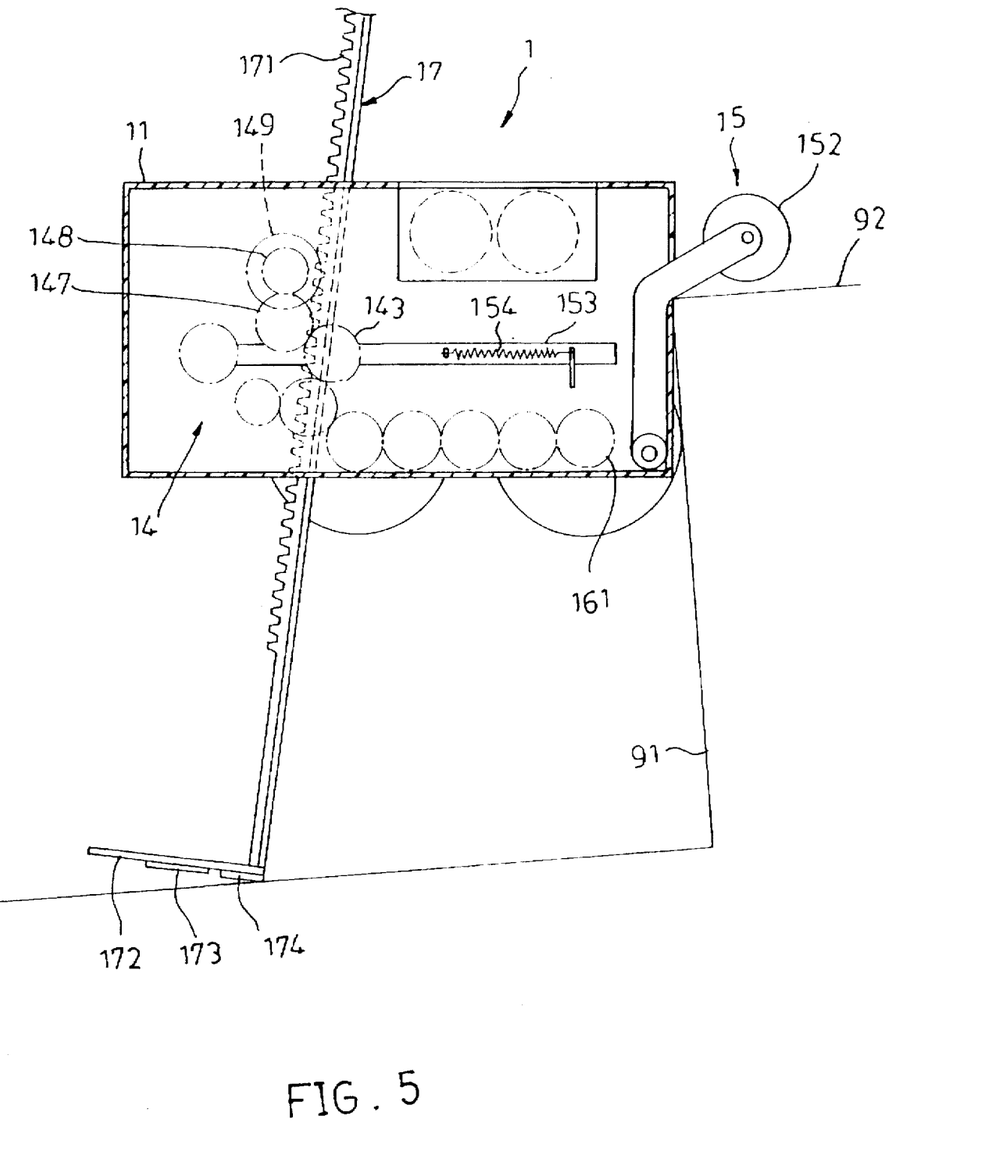
FIG. 5 illustrates how the preferred embodiment climbs over the step of the stairway.
Figure 6:
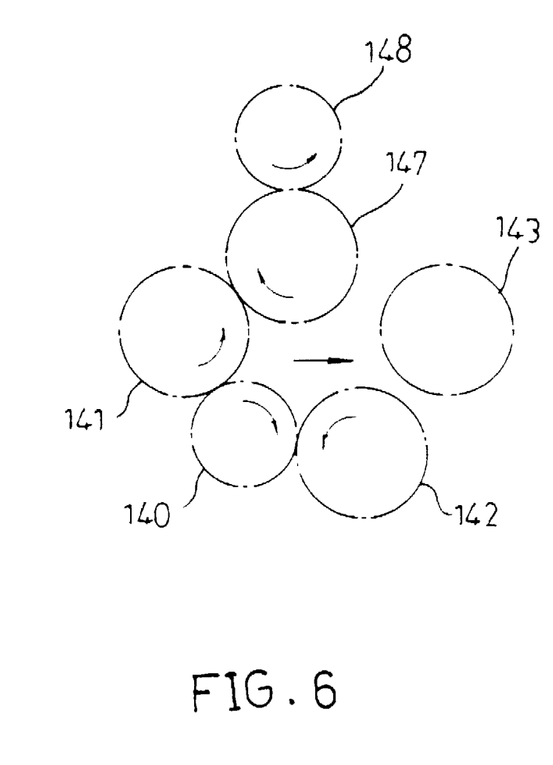
FIG. 6 illustrates the direction changing gear set of the preferred embodiment in a second operating state.

FIGS. 5 and 6 illustrate the climbing device 1 after the housing 11 has ascended to a level such that the contact roller 152 ceases to abut against the step 91 of the stairway and such that the contact roller 152 is disposed above the top surface 92 of the step 91. Since the rack 171 extends through the housing 11 at a rear portion of the latter and not at a central portion of the housing 11, the front portion of the housing 11 slightly leans forward to contact the step 91 while the rack 171 also inclines slightly forward once the contact roller 152 ceases to abut against the step 91. The weight of the housing 11 is borne by the rack 171 and the bevel gear 149 at this time. The weight of the bevel gear 149 is applied to the idle gear 147, while the weight of the idle gear 147 is applied to the second direction changing gear 143 to maintain engagement therewith, thereby permitting continued upward movement of the housing 11 along the rack 171. It should be noted that the force applied by the idle gear 147 to the second direction changing gear 143 should be larger than the restoring force that is applied by the spring 154 such that the distal front end of the support rod 153 does not abut against the push arm 151 at this time. Upward movement of the housing 11 along the rack 171 is continued until the front wheel unit 18 contacts the top surface 92 of the step 91. At this time, the weight of the housing 11 is borne by the front wheel unit 18 and ceases to be borne by the rack 171 and the bevel gear 149. The tension spring 154 then pulls the support rod 153 such that the second direction changing gear 143 disengages the idle gear 147 and the transmission gear 142 and such that the first direction changing gear 141 once again engages the main drive gear 140 and the idle gear 147. As shown in FIG. 6, the first direction changing gear 141 rotates in the counterclockwise direction to result in clockwise rotation of the idle gear 147 and in counterclockwise rotation of the driven gear 148 and the bevel gear 149, thereby causing the rack 171 to once again move upward relative to the housing 11.

Figure 7:
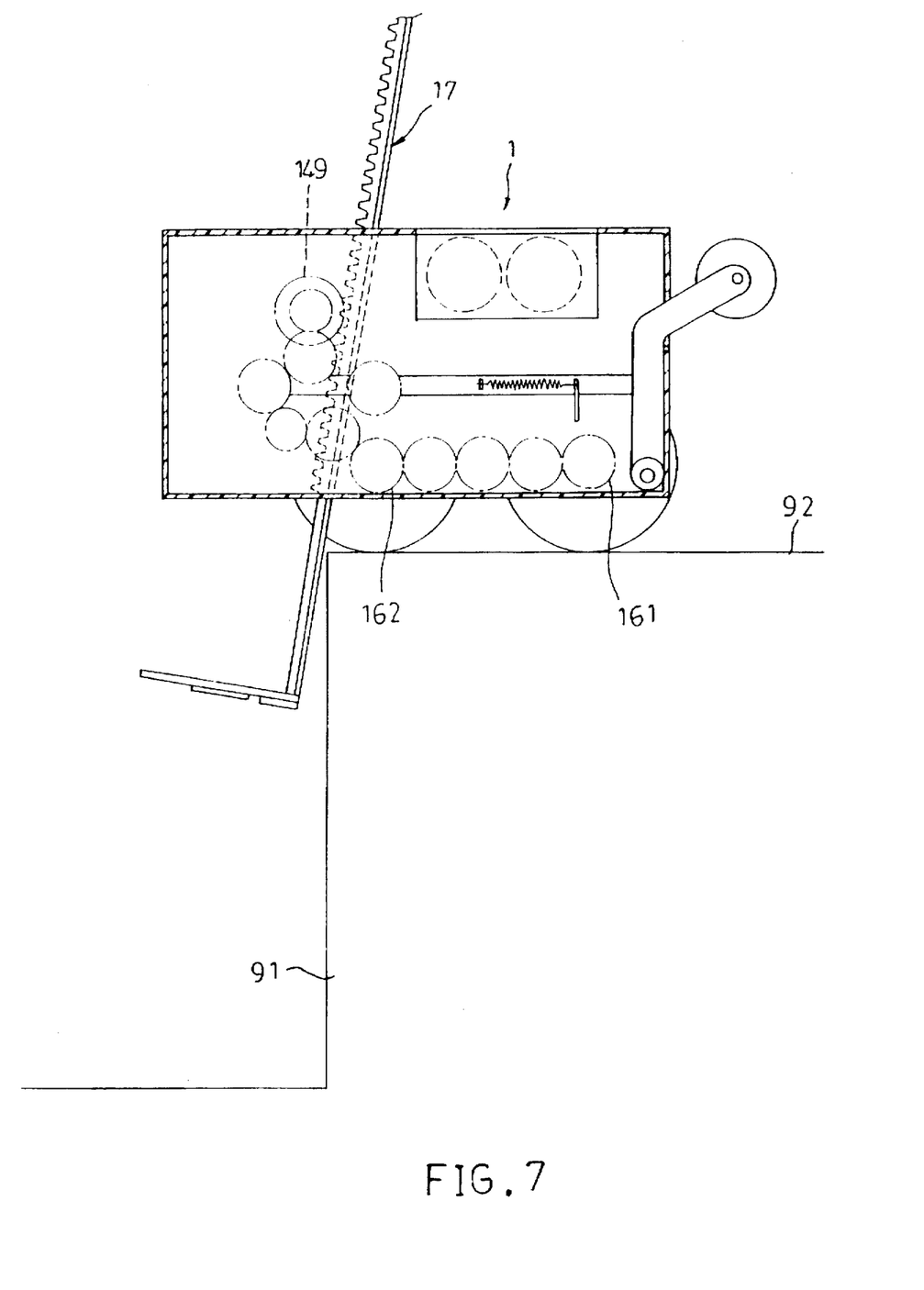
FIGS. 7 and 8 illustrate the preferred embodiment after climbing over the step of the stairway.
Figure 8:
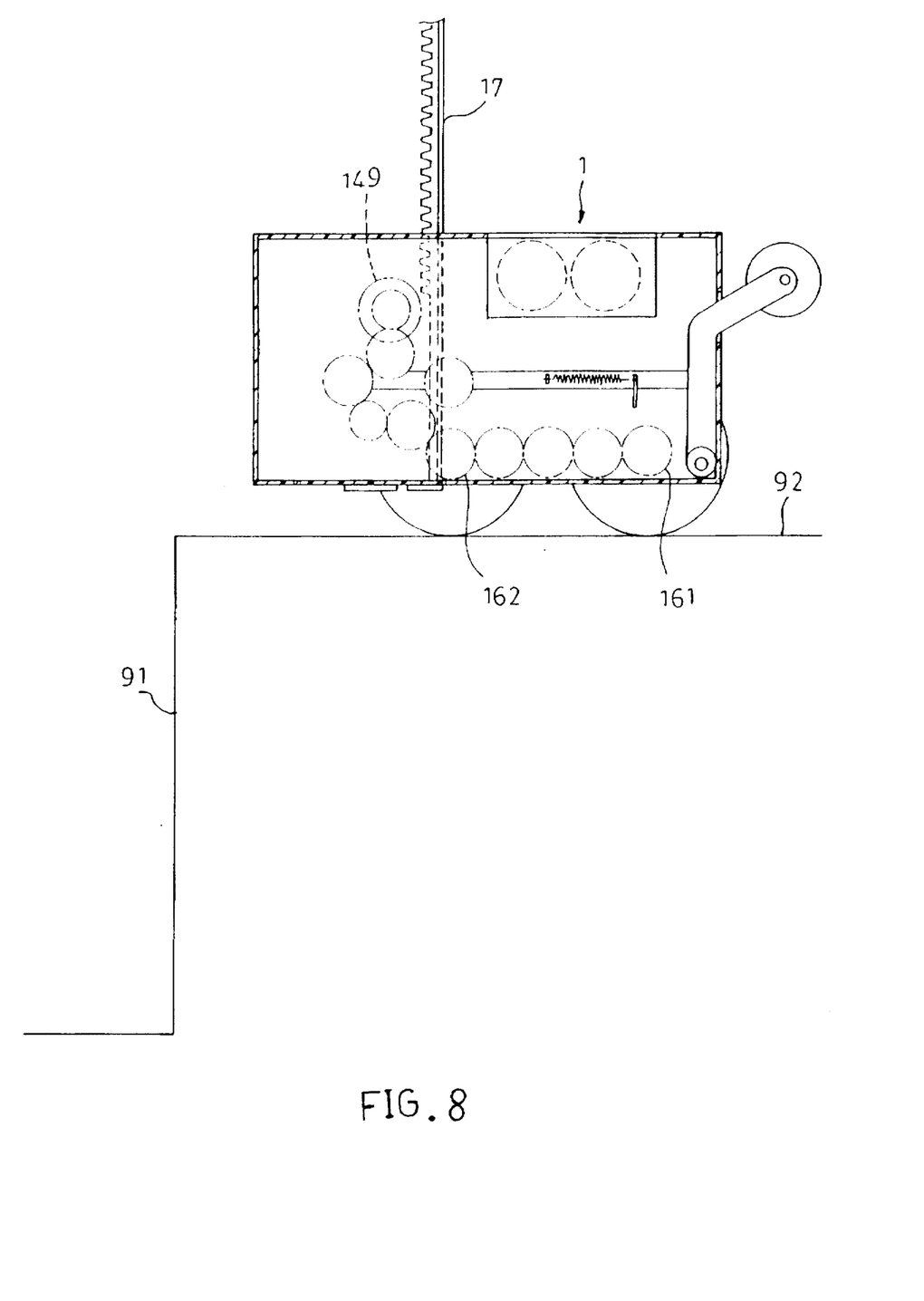

Once the front wheel unit 18 contacts the top surface 92 of the step 91, the climbing device 1 advances on the latter until the rear wheel unit 18 also contacts the top surface 92. At this time, forward movement of the climbing device 1 is temporarily stopped due to abutment between the rack 171 and the step 91, as shown in FIG. 7. The climbing device 1 is once more able to move forward on the top surface 92 when the rack 171 has moved to the upper limit position, as shown in FIG. 8.

It has thus been shown that the device of this invention is not only capable of moving along a flat surface, but is also capable of climbing on top of an obstruction. The object of the present invention is thus met.

While the present invention has been described with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A device capable of climbing on top of an obstruction, comprising:

a hollow housing having top and bottom walls with front and rear portions, aligned rack openings formed respectively at said rear portions of said top and bottom walls, and a front wall interconnecting said front portions of said top and bottom walls and formed with an aperture;

a rotary drive unit mounted inside said housing and provided with a rotary output shaft;

a direction changing gear set disposed inside said housing and including a main drive gear coupled to said output shaft, a transmission gear meshing with said main drive gear, first and second direction changing gears disposed above said main drive gear, a driven gear driven rotatably by one of said first and second direction changing gears, and a bevel gear mounted coaxially on said driven gear;

a rotary wheel set including front and rear drive gears mounted rotatably in said housing and front and rear wheel units coupled respectively and coaxially on said front and rear drive gears for rotation therewith, said front and rear wheel units being capable of supporting said housing on a ground surface, said rear drive gear being driven rotatably by said transmission gear to drive rotatably said front and rear wheel units and move said housing on the ground surface;

a shift unit disposed in said housing and extending out of said aperture in said front wall of said housing, said shift unit having said first and second direction changing gears mounted rotatably thereon and being retractable into said housing upon bumping into the obstruction to move said first and second direction changing gears from a first operating state, where said first direction changing gear meshes with said main drive gear and drives rotatably said driven gear, to a second operating state, where said second direction changing gear meshes with said transmission gear and drives rotatably said driven gear; and a climbing unit including a rack which extends through said aligned openings in said top and bottom walls of said housing and which meshes with said bevel gear, said rack being movable upward relative to said housing when said first and second direction changing gears are in the first operating state and being movable downward relative to said housing when said first and second direction changing gears are in the second operating state.

2. The device of claim 1, wherein said rack has a bottom end which is provided with a transversely extending base plate capable of limiting upward movement of said rack relative to said housing, and an anti-slip piece provided on a bottom side of said base plate.

3. The device of claim 1, wherein said rotary wheel set further includes a plurality of transmitting gears disposed between said front and rear drive gears for coupling said front drive gear to said rear drive gear such that said front and rear drive gears rotate in a same direction.

4. The device of claim 1, wherein said direction changing gear set further includes an idle gear mounted rotatably in said housing between said direction changing gears for coupling said one of said first and second direction changing gears with said driven gear such that said driven gear rotates in a same direction as said one of said first and second direction changing gears.

5. The device of claim 1, wherein said shift unit includes:

a push arm which extends out of said aperture in said front wall of said housing;

a horizontal support rod which is disposed in said housing and which is movable horizontally therein, said support rod having a front end portion adjacent to said push arm and a rear end portion with said first and second direction changing gears mounted rotatably thereon; and a spring interconnecting said housing and said support rod to pull said support rod toward said push arm;

said push arm being retractable into said housing against biasing action of said spring upon bumping into the obstruction to move said first and second direction changing gears from the first operating state to the second operating state.

6. The device of claim 5, wherein said push arm has an upright arm portion and an inclined arm portion, said upright arm portion being disposed in said housing and having a top end and a bottom end mounted pivotally on said bottom wall of said housing, said inclined arm portion extending from said top end of said upright arm portion and out of said aperture formed in said front wall of said housing, said shift unit further including a contact roller mounted rotatably on a distal end of said inclined arm portion.

* * * * *